(12) United States Patent
Aldred et al.

(10) Patent No.: US 6,610,102 B1
(45) Date of Patent: Aug. 26, 2003

(54) DATA CONFERENCING SYSTEM WITH DISTRIBUTED ELECTRONIC SHEET

(75) Inventors: Barry Keith Aldred, Winchester (GB); Howard Shelton Lambert, Southampton (GB); Howard David Mitchell, Richmond-upon-Thames (GB)

(73) Assignee: International Business Machines Corporation, Armonk, NY (US)

( * ) Notice: Subject to any disclaimer, the term of this patent is extended or adjusted under 35 U.S.C. 154(b) by 1272 days.

(21) Appl. No.: 08/678,781

(22) Filed: Jul. 11, 1996

(30) Foreign Application Priority Data

Jul. 29, 1995 (GB) ............................................. 9515602

(51) Int. Cl.[7] ............................................. G06F 17/00
(52) U.S. Cl. ...................... 715/509; 345/753; 715/503
(58) Field of Search ................................. 707/500, 503, 707/504, 509, 538, 539, 531; 345/329, 330, 331, 751–759; 715/500, 323, 504, 509, 538, 539, 531

(56) References Cited

U.S. PATENT DOCUMENTS

| 5,040,131 A | * | 8/1991 | Torres | 707/503 X |
| 5,179,652 A | * | 1/1993 | Rozmanith et al. | 345/331 |
| 5,255,356 A | * | 10/1993 | Michelman et al. | 707/504 |
| 5,293,619 A | | 3/1994 | Dean | |
| 5,321,750 A | * | 6/1994 | Nadan | 380/20 |
| 5,337,407 A | | 8/1994 | Bates et al. | |
| 5,416,895 A | * | 5/1995 | Anderson et al. | 707/503 |
| 5,491,743 A | * | 2/1996 | Shiio et al. | 379/202 |
| 5,499,180 A | * | 3/1996 | Ammirato et al. | 707/503 |
| 5,701,499 A | * | 12/1997 | Capson et al. | 707/503 |

FOREIGN PATENT DOCUMENTS

| FR | 550370 A2 | 7/1993 |
| FR | 550374 A2 | 7/1993 |
| GB | 2247549 A | 4/1992 |

* cited by examiner

Primary Examiner—Joseph H. Feild
(74) Attorney, Agent, or Firm—Edward H. Duffield

(57) ABSTRACT

A data conferencing system includes at least two computer workstations linked by a data network. Each computer workstation is able to store and display an electronic sheet, the electronic sheet being logically divided into a set of cells, each cell being able to contain a single character. A user can select a portion of the electronic sheet, a portion comprising at least one cell, and then perform different editing operations on the selected portion of the electronic sheet. Updates resulting from editing the electronic sheet are then distributed to the other computer workstations in the data conferencing system, so that all the workstations in the data conferencing system share the same electronic sheet.

16 Claims, 5 Drawing Sheets

|   |   |   |   |   |   |   |   |   |   |   |   |   |   |   |
|---|---|---|---|---|---|---|---|---|---|---|---|---|---|---|
| T | E | A | M |   | A |   |   |   |   |   | 1 | 0 | 0 |   |
| C | H | A | R | L | E | S |   |   |   |   |   |   |   |   |
| J | O | N | E | S |   |   |   | T | E | A | M |   | B |   |
| S | M | I | T | H |   |   |   |   |   |   |   |   |   |   |
| S | T | E | V | E | N |   |   | B | R | O | W | N |   |   |
|   |   |   |   |   |   |   |   | G | R | A | Y |   |   |   |
|   |   |   |   |   |   |   |   | G | R | E | E | N |   |   |
|   |   |   |   |   |   |   |   | W | I | L | S | O | N |   | ns
DATA CONFERENCING SYSTEM WITH DISTRIBUTED ELECTRONIC SHEET

FIELD OF THE INVENTION

The invention relates to a data conferencing system including at least two computer workstations linked by a data network.

BACKGROUND OF THE INVENTION

Nowadays the users of data processing systems have an increased need of real-time interaction with the users of other systems. For instance, projects due to their complexity are developed by one or more groups of people who can be located in different places causing difficulties in arranging meetings among them.

Typically desk top conferencing is used to allow the needed interaction, which normally includes data collaboration facilities, supplemented by basic audio and video exchange.

The most common real-time data capability is the chalkboard or whiteboard which provides an ability either to exchange basic drawings or to annotate a base image. Such a system is described for example in "Beyond the Chalkboard: Computer Support for Collaboration and Problem Solving in Meetings" by M Stefik, G Foster, D Bobrow, K Kahn, S Lanning and L Suchman, p32–47 in Computing Practices, Communications of the ACM, Vol 30, Number 1, January 1987. Extensions to the basic graphic chalkboard facilities frequently include some support for adding text information through marker pen support or text entry and edit. Typical examples of the kind of information and associated analysis might be: ranking of employee performances on multiple criteria, exploring sales data, preliminary project costings, and so on. However, the essence of a chalkboard is freeform drawing on a blank sheet of paper or a previously retrieved image and a characteristic of the computer chalkboard is that it is optimized for graphic exchanges through its simulation of the conventional physical chalkboard. Consequently, when the shared user information is purely character or numeric, difficulties may arise because these characteristics of the chalkboard are not designed for the easy handling of textual data. Thus there is generally very little support for users to efficiently manipulate text using a mouse or marker pen across the chalkboard.

Other systems which provided a data sharing facility are disclosed in EP-A-0550370 and EP-A-0550374.

Conventional spreadsheets typically provide the users with facilities able to handle such coded textual or numeric data, but they do not map well into the informal collaborative environment. This is principally because the visible contents are often linked by an invisible set of equations, which may only be known or understood by the originator of the spreadsheet. It is therefore very hard to look at an arbitrary spreadsheet document and manipulate the data in a collaborative working environment without understanding these hidden relationships.

Also known in the prior art is a remote access program, such as the NetView Distributed Console Access Facility (DCAF) product available from IBM Corporation, which allows a user to access a computer of a remote user whilst the remote user is working on it. In this case both users can share all the data, the programs and the environment of the remote computer. However, the user who accesses the remote computer might have to work in an unknown environment, maybe using an unknown wordprocessor. Moreover such a remote access program is not really appropriate for a peer to peer conferencing or collaborative working environment.

OBJECTS OF THE INVENTION

Hence, it is an object of the present invention to provide a data processing system for allowing users to interact simultaneously on shared data, particularly character-based data.

BRIEF SUMMARY OF THE INVENTION

Accordingly the present invention provides a data conferencing system, including at least two computer workstations linked by a data network, each computer workstation including:
    means for storing and displaying an electronic sheet, the electronic sheet being logically divided into a set of cells, each cell being able to contain a single character;
    means to enable a user to select a portion of the electronic sheet, a portion comprising at least one cell;
    means, responsive to a user input, for editing the selected portion of the electronic sheet; and
    means for distributing updates resulting from editing the electronic sheet to the other computer workstations in the data conferencing system, such that all the workstations in the data conferencing system share the same electronic sheet.

The electronic sheet is somewhat similar to the chalkboard, in that it too is designed to simulate a conventional chalkboard in a desktop conferencing environment, allowing different users to freely input and edit data across the electronic sheet. However, whilst the chalkboard is graphics based, the electronic sheet is based on a character grid, and is optimized for text processing and manipulation. Note that a large fraction of conferences are indeed based around textual (including numerical) data, rather than image or graphical data. An additional benefit of using a character-based system is that the data processing and transmission operations are very simple. It is therefore easy to operate the electronic sheet conference across even low bandwidth networks. A further advantage of the simple data flows is that it is straightforward to implement the electronic machine on top of known data conferencing systems, rather than having the difficulty of writing a fully distributed application.

The electronic sheet effectively provides users with a sort of blank page designed to handle character and numeric information. It is expected that several users make contributions, typically in different areas of the sheet in parallel, and these are subsequently tidied up using the editing commands.

In the preferred embodiment, a selected portion is visually highlighted, for example by shading gray or by outlining with a heavy line, and at the users request the grid of cells is shown displayed on the electronic sheet. The available editing operations include both those performed en bloc upon the selected portion of the electronic sheet, for example moving or copying the contents of the selected portion to another location on the electronic sheet, as well as those performed upon the characters contained within the selected portion of the electronic sheet, for example, sorting or aligning the text within the selected portion.

The preferred embodiment further comprises means for performing mathematical operations on the characters within the selected portion of the electronic sheet. The ability to perform generally arithmetic computations simply within the electronic sheet application greatly increases the utility of the application, and is particular beneficial when the electronic sheet is being used to work with tabular data.

It is preferred that once a user has selected a portion of the electronic sheet, users at other workstations are prevented from selecting the same portion of the electronic sheet. The advantage of effectively locking a selected area is that it precludes the confusion that might otherwise arise if two different users were to try to perform possibly conflicting operations simultaneously within the same region. Note however that different users may still operate in parallel on different regions of the sheet, so that this approach is more efficient than locking the entire electronic sheet, each time a user wants to perform an edit operation. Clearly it is the responsibility of the users that the areas which they select are no bigger than necessary for their intended operation, thereby retaining the maximum available space for the other users in the data conference. Similarly, they should perform their intended operation as quickly as possible. Note that in the preferred embodiment, the selected region is deselected after each editing operation, thereby maximizing the accessibility of all regions of the sheet to the data conference participants.

In the preferred embodiment, the characters within the electronic sheet are stored in ASCII format. This has the advantage of being standard, so that data may be readily exchanged into and out of other programs (for example by the clipboard), and is easy to manipulate and store. It would of course be possible to develop a more extended character set, for example a two-byte set. This would allow a much greater range of characters, for example including mathematical symbols, although it may require special character handling routines if standard string handling routines are no longer applicable.

Although the electronic sheet application is primarily intended for use in a collaborative or conferencing environment, it is possible that some users may want to use it on a stand-alone basis. One reason for doing this might be to prepare material in advance to be imported into a subsequent conference using the electronic sheet application. Thus the invention further provides a computer workstation including:

means for storing and displaying an electronic sheet, the electronic sheet being logically divided into a set of cells, each cell being able to contain a single character;

means to enable a user to select a portion of the electronic sheet, a portion comprising at least one cell; and means, responsive to a user input, for editing the selected portion of the electronic sheet.

The invention also provides a method of operating a data conferencing system, including at least two computer workstations linked by a data network, said method comprising the steps at each workstation of:

storing and displaying an electronic sheet, the electronic sheet being logically divided into a set of cells, each cell being able to contain a single character;

selecting, responsive to user input, a portion of the electronic sheet, a portion comprising at least one cell;

editing, responsive to a user input, the selected portion of the electronic sheet; and distributing updates resulting from editing the electronic sheet to the other computer workstations in the data conferencing system, such that all the workstations in the data conferencing system share the same electronic sheet.

BRIEF DESCRIPTION OF THE DRAWINGS

The present invention will be described further, by way of example only, with reference to an embodiment thereof as illustrated in the accompanying drawings in which:

FIGS. 3A–3E provides a set of examples illustrating some editing operations performed in the electronic sheet application.

DETAILED DESCRIPTION OF THE PREFERRED EMBODIMENT

Figure 1:
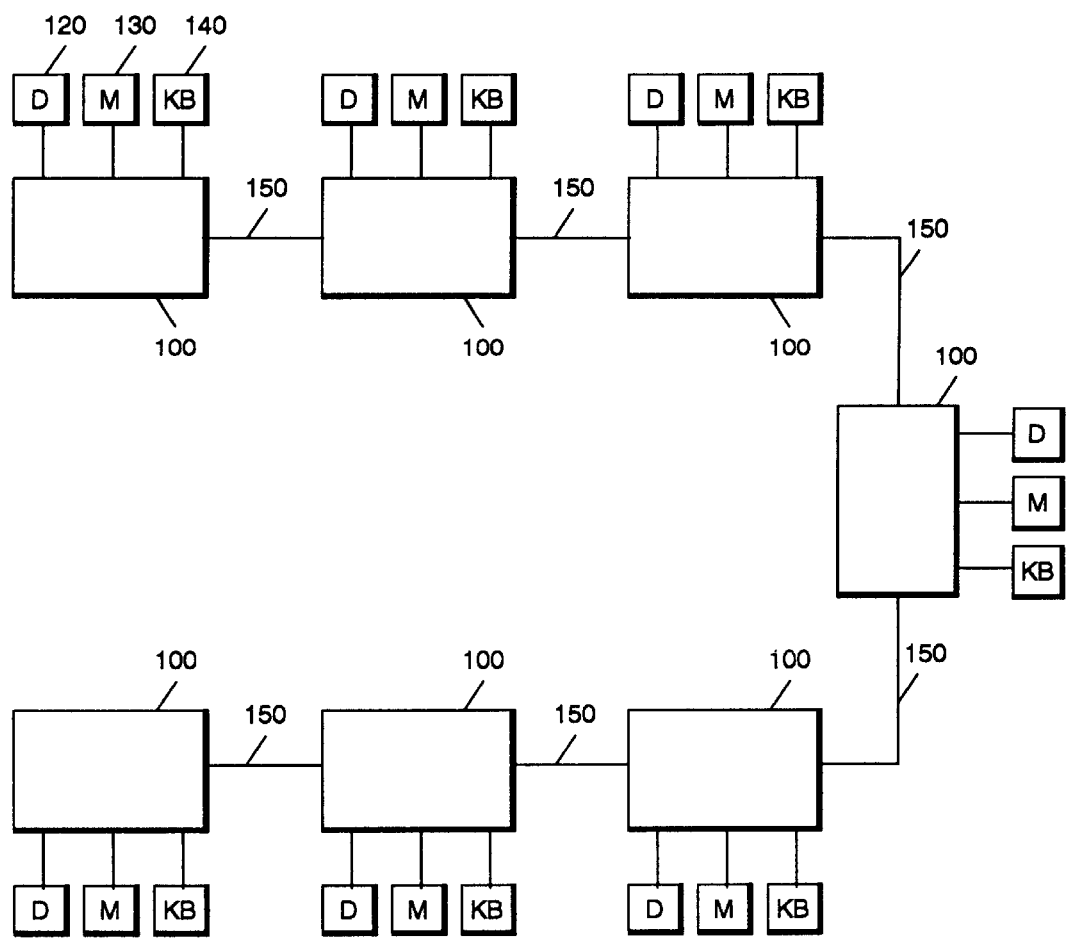
FIG. 1 is a simple block diagram of a set of computer workstations which may participate in a data conference.

With reference to FIG. 1, a group of computer workstations 100 is attached together in a network by a data connection line 150. Each computer workstation 100 includes a set of conventional devices such as a display device 120, a pointing device, such as a mouse 130 and a keyboard 140. Such workstations are well-known in the art, and will not be described further. Likewise, the data connection lines may be any known form of link, for example a LAN connection (Token Ring or Ethernet), an ISDN line, and so on. Similarly the topology of the data network in FIG. 1 is schematic only, and any suitable network topology may be used.

Each user of the conference can display a data file on his or her computer workstation on a screen which is shared between all the users of the data conference. This screen shall be referred to as an electronic sheet. Text can be entered onto the electronic sheet by means of a keyboard 140, and control commands inputted using the mouse, in the same fashion as for a conventional word-processor.

A copy of the same electronic sheet exists locally at each workstation, thereby allowing its contents to be viewed by all the users. Thus when a user modifies their own copy, this modification is propagated by the system to each attached workstation. In order to achieve this, each node or workstation needs to run conferencing software, which distributes any locally performed edits to the other nodes in the conference, and receives information on remotely performed edits and implements these locally. Such conferencing software is well-known in the art, see for example the above-mentioned paper by Stefik et al, and also the book "IBM Lakes: An Architecture for Collaborative Networking", R Morgan Publishing, 1994 (ISBN 0-902979-13-2), and so will not be described in detail.

In order to maintain consistency of the electronic sheet, it is important that the edits on the electronic sheet are performed in the same order at each workstation (a property known as serialization). Again, many well-known conventional techniques are available to achieve this serialization. One of the simplest is to provide a form of locking by means of a token which circulates around each node of the network in turn. A node can only edit the electronic sheet when in possession of the token. Thus when a node receives the token, it retains the token whilst the edit operation is performed, and copied to the other nodes. Then, after confirmation has been received that the other nodes have applied this edit, the node then returns the token to circulation. A potential drawback with this technique is that only one user in the data conference can write on the electronic sheet at a time. An alternative approach to serialization is for all updates to be sent initially to a single node, which orders them before distribution to the remaining nodes. Yet another possible approach is described in patent application GB 9425429.9, filed Dec. 16, 1994 and entitled "Data Conferencing Network" (IBM docket UK9-94-025).

Figure 2:
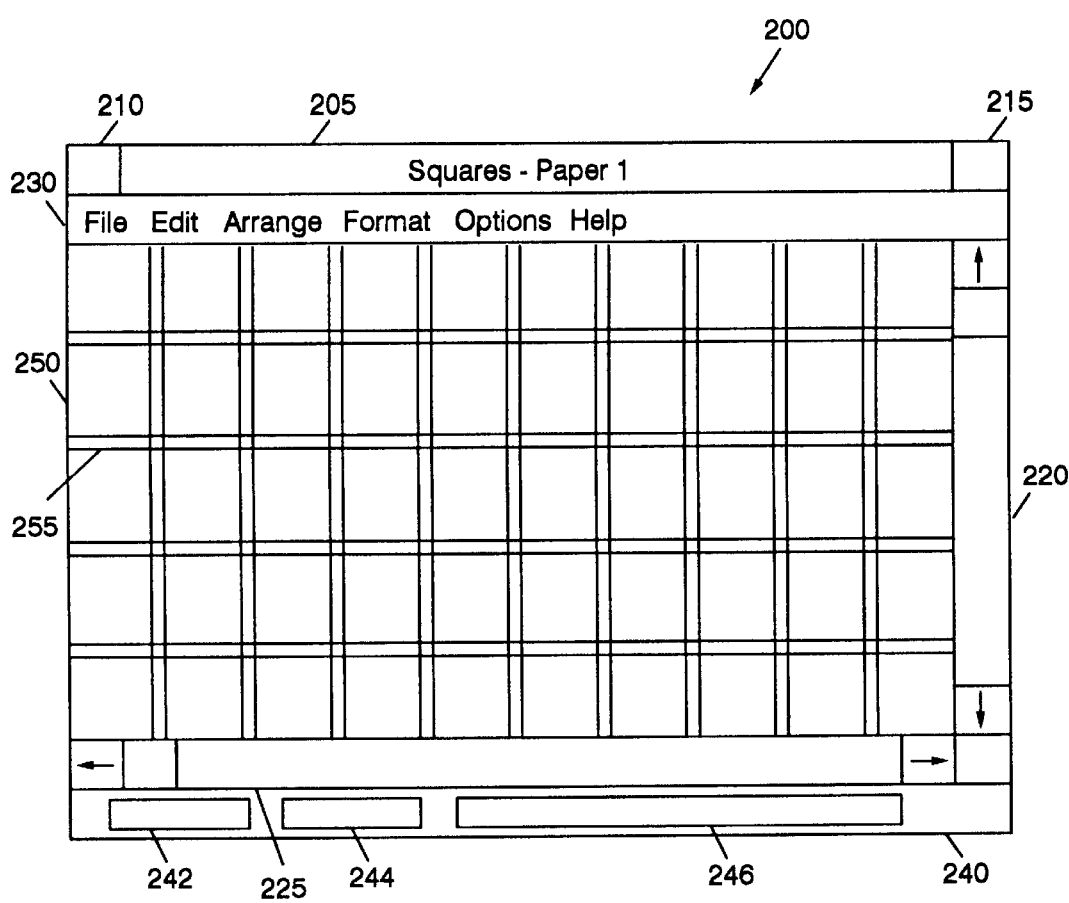
FIG. 2 illustrates the initial screen of the electronic sheet application.

An example of an electronic sheet is shown in FIG. 2 which is a standard windowed application. The screen 200 in FIG. 2 has a conventional title bar 205 for displaying the name of the electronic sheet application ("Squares"), plus also the name of the particular sheet which is currently being displayed ("Paper 1"). Either side of the title bar are standard control buttons 210, 215 for closing (amongst other things) and minimizing the electronic sheet application respectively. Beneath the title bar is a menu bar 230, which the user selects using the mouse/cursor to perform various actions; these are described in more detail below (a conventional tool bar, customizable by the user, could also be added below the menu bar if desired to allow frequently performed actions to be directly selected). The bulk of the window provides a representation of the electronic sheet itself 250, which is also described in more detail below. Conventional vertical and horizontal scroll bars 220, 225 allow the user to move across the electronic sheet, making visible other regions of the sheet (if any) which currently lie outside the window display. Finally, conventional status line 240 is used to provide the user with information reflecting the operation being performed. In particular, the status line has three components: the first box 242 is used to display the coordinates of opposing corners of a user-selected region within the electronic sheet; the second box is used to display the coordinates of the cursor within the selected region; and the third box is used to display general information about commands or error messages, as is well-known in the art.

A key characteristic of the electronic sheet, which allows for easier management by the user of the contents of the sheet, is that the sheet is logically divided into a grid pattern of cells. Each cell can contain only one character. The default representation of the electronic sheet 250 includes this grid pattern lightly marked with every fifth row and column of the grid high-lighted (for the sake of clarity, FIG. 2 only shows the row/column high-lighting lines 255, rather than the complete grid marking).

The operation of the electronic sheet will be now discussed. It is assumed that each user in the network of workstations of FIG. 1 is already running the necessary data conferencing software. As described in the aforementioned book on the IBM Lakes data conferencing architecture, the user at any one workstation may call one or more users at the other workstations, indicating that they wish to include the shared electronic sheet in the call. As a result of this, the electronic sheet application is launched at each called workstation, as well as at the calling workstation (alternatively, the electronic sheet could actually be incorporated into the data conferencing software).

Once the electronic sheet application is running at each workstation, initially each workstation typically displays the window shown in FIG. 2. The various operations that can be performed by the user to enter data into the electronic sheet and then edit the data will now be described in relation to a single user. However, it will be remembered that details of these updates are also passed to the data conferencing system, which then distributes them to the other workstations. Likewise, the electronic sheet application will also receive updates generated by remote users via the data conferencing software, which are applied to the sheet as if they had been generated locally.

Working on the screen shown in FIG. 2, a user selects a region of interest in the displayed sheet, by marking a rectangular region with the mouse. Thus the mouse is moved to one corner of the region to be selected, and then a mouse button depressed until the cursor has been moved to the opposite corner of the region to be selected, whereupon the mouse button is released. Note that a single click of the mouse button whilst the mouse is stationary will simply select the cell in which the cursor is currently located. The selected area is high-lighted (marked as a grey box), both actively during the selection process whilst the mouse button is depressed, to provide visual feedback to the user, and also after the selection has been completed. In addition to the high-lighting, as previously mentioned, the coordinates of the opposing corners are listed in status box 242. It will be appreciated that this method of area selection with high-lighting is very well-known in the art.

Once a particular area has been selected, a single mouse click anywhere on the sheet cancels the selection, allowing the user to make a new selection. Alternatively, a double click within the selected area results in a text entry mode for the selected region. This mode allows the user to type text into the selected region, which behaves as a miniature document. Thus text flows onto a new line at the boundary of the region, and carriage control is effective within the confines of the region. As text is entered into the selected region, it is displayed on the screen in conventional fashion. Text may either overwrite existing text, or shift it along, depending on whether overwrite or insertion mode is selected. As mentioned above, status box 244 is used to display the coordinates of the current cursor position for text entry. Note that it is quite possible that the selected region already contains some text from a previous editing operation.

While in text input mode, the selected region can be resized by dragging and dropping the edge or corner of the region, in the same way that a window is conventionally re-sized. This is particularly beneficial if the user has underestimated the amount of data to be entered into the selected region.

The only awareness within the selected region of the rest of the sheet during text input mode in the preferred embodiment is that tab stops are set globally (although in a different implementation they could be locally defined). It may be desirable, particularly in the former case, to have some visible indication of the tab positions, for example at the top of the displayed grid, or perhaps having the tab stops coincident with the emphasized grid lines 255.

After the desired text has been entered, the user clicks once on the electronic sheet outside the selected area, and this ends the text entry mode and returns the application to the state of waiting for another region to be selected. Alternatively, the user may exit from the text entry mode by hitting Enter (a new line is started in text entry by Shift-Enter).

Discussing now the other editing operations that can be performed on a selected region of the electronic sheet, the region may be moved or copied en bloc in conventional fashion by dragging (with a depressed mouse button) and then dropping in the desired new location. If this operation is performed with the "CTRL" button depressed a copy operation results, otherwise a move operation occurs. Note that any characters within the selected region are similarly moved/copied.

A further set of editing operations is available by means of the tool bar. For example, selecting the Edit option offers a menu including the following possibilities:

Undo: the electronic sheet contents are returned to their state before the issuing of the last user command;

Repeat: the last user command is repeated;

Cut: the contents of the selected region are deleted and moved onto the system clipboard;

Copy: the contents of the selected region are copied onto the system clipboard;

Paste: the data stored in the clipboard is copied into the selected region of the electronic sheet. This provides a simple mechanism for text from external wordprocessors, spreadsheets etc to be copied into the electronic sheet;

Delete: the contents of the selected region are deleted;

Insert Col/Row: a new Column or Row is inserted at the cursor location within the selected region. The contents of the selected region below (to the right of) the inserted row (column) are shifted accordingly;

Delete Col/Row: an existing Column(s) or Row(s) is removed at the cursor position by deleting its contents, and the remaining contents of the selected region are shifted accordingly.

Note that for the final two operations, the size of the selected region itself is not affected, and the sheet contents outside the selected region are also unaltered. For the insert operation, if the data no longer fits within the selected region, an error message is returned. A similar error message is returned for example if the user tries to paste text data into too small a selected region.

Selecting the Format option on the tool bar provides a menu including the following possibilities:

Capitals: this converts the text within the selected region to capitals, or vice versa;

Calculate: this can be used to either sum a column of numbers in a list, or to evaluate an expression. In either case the result is placed on the system clipboard, for pasting elsewhere onto the electronic sheet.

The provision of simple calculating facilities, typically to provide basic arithmetic functions, greatly assists if working with numerical data. Note however that unlike a spreadsheet, there are no hidden expressions which automatically apply to the data. Thus the sheet adopts a simple WYSIWYG ("what you see is what you get" approach), which is most appropriate for a collaborative environment. Of course, it would still be possible to have some macro capability to store frequently used computational expressions, so that they may be more easily invoked.

The Arrange option on the tool bar provides the following possible actions:

Sort: this allows sorting each line in the selected region in ascending or descending order, potentially using a variety of criteria, such as sorting on multiple fields;

Wordflow: this word flows the text contents within the selected region (in other words, treating the region as continuous text, there are no word breaks at the end of a line, but rather the word is dropped into the next line).

Compress: this replaces multiple contiguous blank spaces with a single blank space, shifting the remaining data accordingly in the requested direction;

Squash: this is similar to Compress, but removes all blanks spaces from the selected region by shifting the data in the requested direction;

Align: this aligns the contents of the selected region to the specified boundary; (another embodiment might provide some form of centering);

Note that the Compress, Align and Squash options are associated with a selected direction (ie top, bottom, left or right).

Other options on the tool bar 230 are not necessarily tied to a particular area. For example the File option allows the contents of the current electronic sheet to be saved to disk as a file, or the contents of a previously saved sheet to be loaded into the current electronic sheet. The Options selection on the tool bar includes the following possibilities:

Font: sets a font for displaying the text on the electronic sheet;

Grid: determines whether or not to display the grid lines (might also be used to control whether every fifth row/column is highlighted etc);

It will be noted that the Font option applies to the whole electronic sheet. The reason for this is that in the preferred embodiment, each character in the electronic sheet is represented by a single ASCII character, and so has no room for associated font information. However, this can be retained effectively as a display option, so that when the contents of the electronic sheet are displayed on the screen, the desired font is used for the entire sheet. It may be decided not to distribute font updates to other workstations in the data conference, so that each user may view the sheet in their own selected font. One reason for this being sensible is that the different workstations may not all be equipped with the same fonts. Similarly, with respect to the Grid option, it is a matter of design choice whether each individual user can select their own grid pattern, or whether a single grid pattern is shared between all users (so that any update affects all users).

Overall, the various available options provide a powerful set of tools for efficiently manipulating the contents of the electronic sheet. Thus character data may be rapidly re-arranged, lists produced, broken apart or combined. Data can be gathered from all over the sheet, whilst different regions can be treated as mini-documents. Formatting is made much more straightforward by the underlying rectangular character array.

It will be appreciated that the present invention primarily derives from the underlying structure of the electronic sheet. In contrast, the majority of the edit operations that can be performed on the electronic sheet are fairly standard per se. The skilled person will easily conceive of operations in addition to those listed above (or modifications of the listed operations).

It is important to note that after a particular operation has been performed on or within the selected region (with the exception of simply moving/copying the selected region), the electronic sheet application retains no record of the region itself. Instead, the application returns to the state in which a new region may be selected, although obviously the text contents within the region are retained as part of the overall electronic sheet. An alternative embodiment might be provided in which a sequence of operations all relate to the same selected region, until that selected region is deselected, either explicitly (eg by a specific tool bar action) or implicitly (eg by deleting it).

In the preferred embodiment, no other user is allowed to operate on a region which has been selected by another user. Thus after each area selection, the relevant coordinates are passed to the conferencing software, and distributed to the other nodes in the conference. These then provide a visual indication of the regions that have been selected by remote users (eg by cross-hatching). Any attempt by the local user to select all or part of such a region (or move a currently selected region into such a region) is forbidden, and results in an error message. Note that the simultaneous selection of the same region by two different users can be prevented by an appropriate serialization mechanism, so that only the first user is successful.

It will be appreciated that with the exclusion of others from a selected area, as in the preferred embodiment, the de-selection of an area after each single operation (which is also part of the preferred embodiment) helps to prevent any one user in the conference from monopolizing a given portion of the electronic sheet for too long.

Figures 3A, 3B:
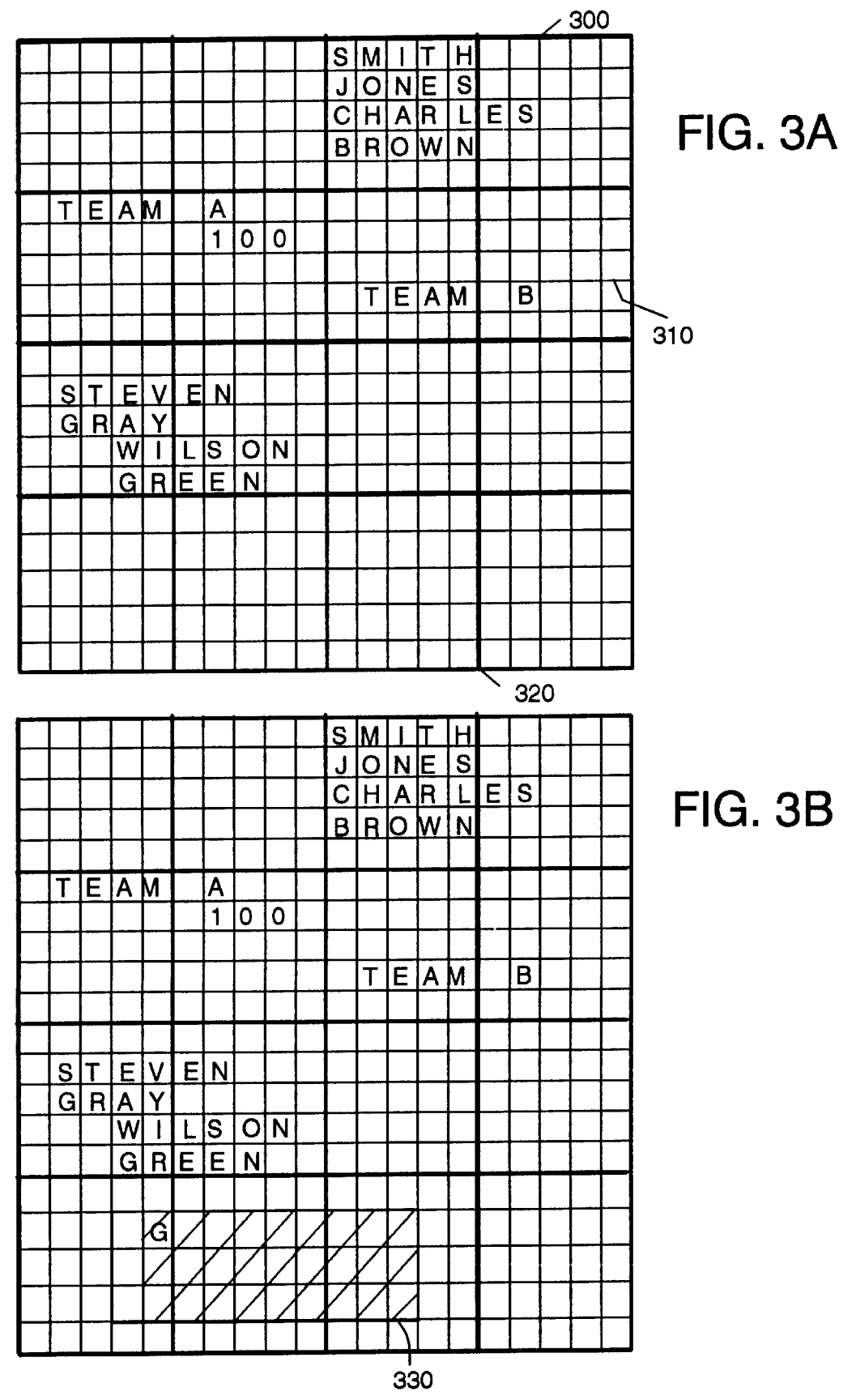
Figure 3C:
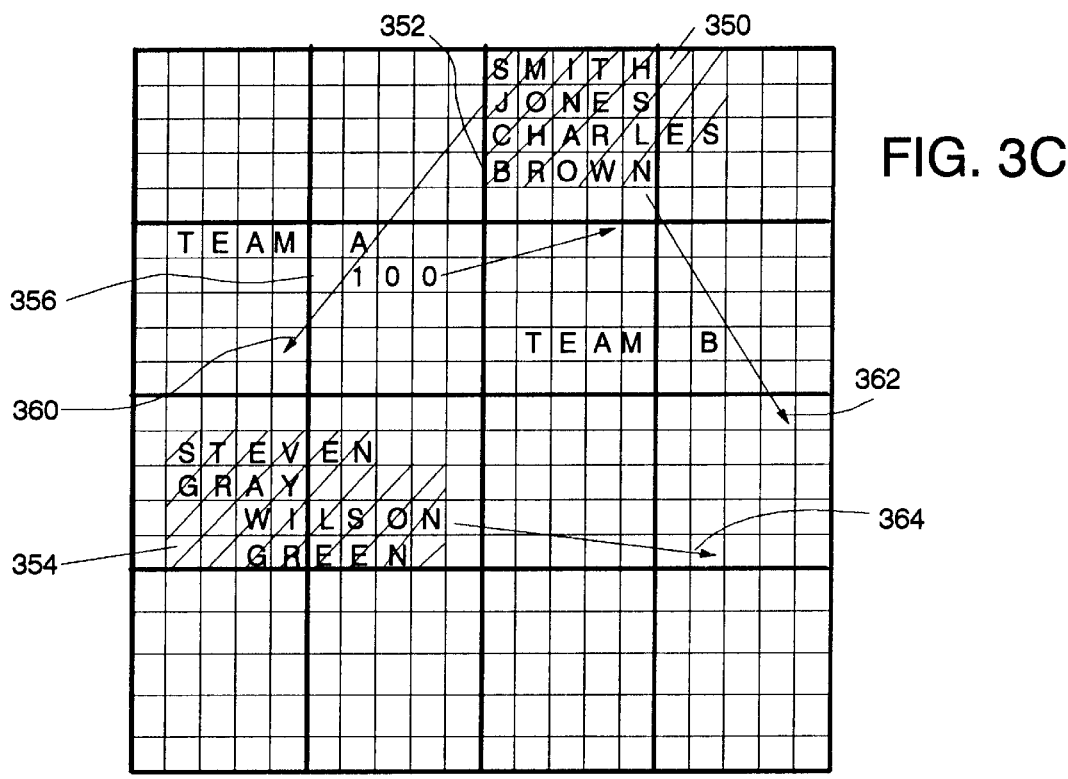

Referring now to FIGS. 3A–3E, examples of the electronic sheet in the preferred embodiment will be described. In FIG. 3A an electronic sheet 300 is shown, minus the conventional scroll bars, tool bar etc. It is divided into rectangular cells, each cell containing no more than one character. In this example grid lines 310 are visible for helping the user activities and one grid line 320 every five is highlighted (a slightly different form of high-lighting from that of FIG. 2 is shown). It will be appreciated that displaying the grid and/or the high-lighted lines is optional. Some text data is displayed on the sheet 300.

In FIG. 3B the text entry mode of the electronic sheet is shown. The user has selected an area 330 of interest as described above, which is high-lighted by shading. For text entry, a cursor (not shown) is displayed in the region 330, indicating the cell into which the following entered character will be inserted. As shown in FIG. 3B, so far the letter "G" has been inputted into the selected area (or alternatively it was already there prior to the area being selected).

Figure 3D:
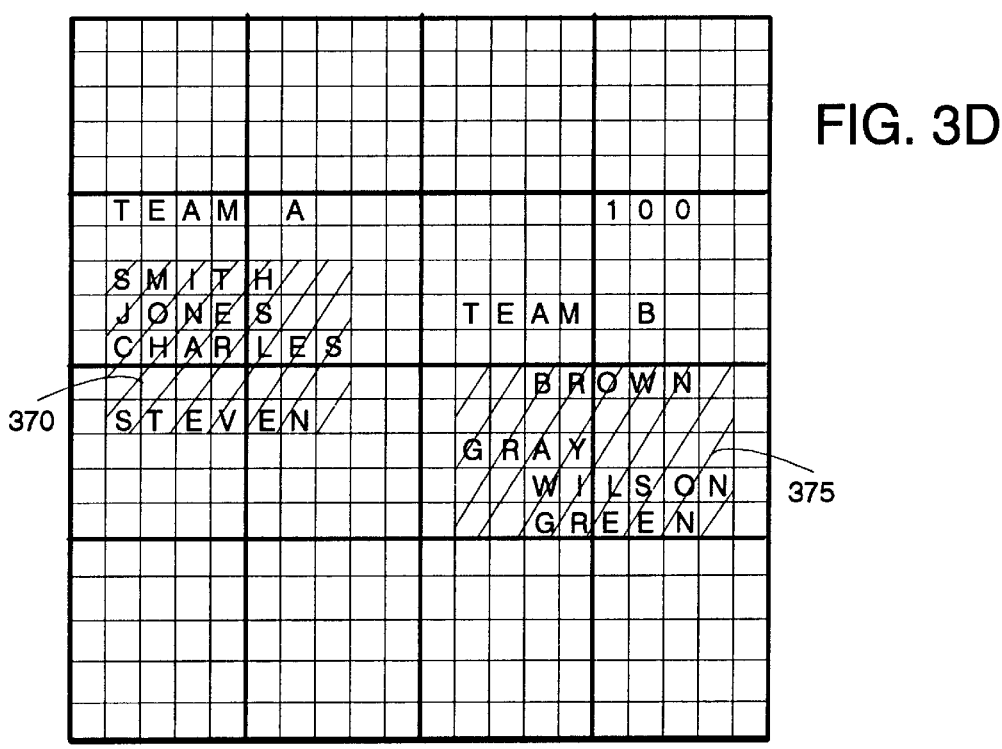

FIGS. 3C, 3D and 3E show three states representing an example of an editing operation to re-arrange data, respectively an initial, an intermediate and a final state. The task being performed in this sequence is to assign the displayed names to two lists and tidy up the result. In the initial state (FIG. 3C) areas are highlighted one by one, and dragged roughly into a new position, for example as shown by the arrows. Thus region 350 is moved in accordance with arrow 360, region 352 is moved in accordance with arrow 362, and regions 354 and 356 are moved in accordance with arrows 364 and 366 respectively. It will be appreciated that any one user can only select a single region at any given time, so this would represent four select/move operations performed in turn by one user. Of course, alternatively different select/move operations could be performed in parallel by different users in the data conference.

FIG. 3D shows the result of the operations described with reference to FIG. 3C. Two new areas 370 and 375 have now been selected, and for each region, the user performs an alignment to the left of the region, a compression to the top of the region, and a sort in descending order. The result of these operations is shown in FIG. 3E. Again, it will be appreciated that to achieve this the user must perform (for example) a select/align operation, a select/compress operation, and then a select/sort operation. Two users may operate simultaneously on the two different lists of names.

The electronic sheet application is implemented in terms of two basic components, firstly a graphical user interface, and secondly an underlying data storage/manipulation component. The former may be readily implemented using the Visual Basic product, available from Microsoft Corporation. This allows the standard window features shown in FIG. 2 to be easily provided, together with mouse area selection, highlighting etc. The actual data file associated with the character information on the electronic sheet is stored as a simple ASCII file. An early prototype implementation used a square character matrix for storing this information, but this was subsequently replaced by a set of character strings, each representing one line in the electronic sheet. This is because string handling operations are generally relatively quick in most computer environments. A consequence of this is that the electronic sheet handles horizontal manipulations more quickly than vertical manipulations; however, the majority of manipulations fall into the former category, this being the normal direction of reading and writing.

In addition to the ASCII data file containing the contents of the electronic sheet, the application also maintains various information such as the coordinates of any locally selected area, any remotely selected areas, the cursor position, etc. With this information, it is then straightforward to interpret any edit operation in terms of manipulation of the ASCII data file representing the electronic sheet, and/or the coordinates of the selected regions. For example, the above-described Align operation simply shifts the location of the appropriate characters within the ASCII data file until they are adjacent the boundary of the selected area.

Additionally, the electronic sheet application needs to interact with the conferencing software. Effectively this only involves transmitting (i) updates to the ASCII data file containing the sheet contents, and (ii) coordinates of each newly selected (or deselected) area. Corresponding data will of course be received from other nodes. The remotely generated updates to the ASCII data file are simply applied to the local data, and then reflected on the displayed electronic sheet. The coordinates of the remotely selected areas are stored, to prevent the local user from selecting or intruding into them, and also displayed on the electronic sheet to provide a visual warning of this fact.

Because the electronic sheet is character based, the actual data flow between the different workstations in the data conference is very low. Similarly, notification of selected/deselected regions can be transmitted very economically. Thus it is feasible to operate the electronic sheet over very low bandwidth lines, which may not be able to support a full conferencing chalkboard. Further, if the data network is one which charges according to actual data flow, use of the shared electronic sheet will be a very inexpensive option.

While the preferred embodiment uses ASCII data to store the contents of the electronic sheet, another embodiment might adopt a different character set. For example, allocating two-byte storage would allow a much greater range of symbols to be used to represent non-literal characters, such as mathematical symbols (of course two-byte storage would be the norm for countries, such as Japan, whose language effectively has a very large alphabet). Note however that even if a wider range of symbols is provided, the underlying grid still exists, restricting the size and precise location of the characters. If it is desired to allow free-form annotation of the electronic sheet, this is probably best accomplished by use of a two-plane system, in which a conventional free-form chalkboard is superimposed onto the electronic sheet, which would provide great flexibility overall.

The electronic sheet has been described hitherto primarily in relation to a collaborative environment, but there is no reason why it cannot be used as a standalone product. In this case, the only difference is that edits generated by the user will not be distributed to any other workstations. A single user is generally likely to prefer the more powerful capabilities of a conventional word processor or spreadsheet, but the combined simplicity and power of the electronic sheet may prove attractive in some circumstances. Of course, it is quite probable that a user may want to use the electronic sheet on an individual basis, in.order to prepare a sheet which is subsequently to be discussed in a data conference.

Therefore, what is intended to be protected by Letters Patent is described in the appended claims which follow by way of example and not by way of limitation, wherefore what is claimed is:

1. A data conferencing system, including at least two computer workstations linked by a data network, each computer workstation including:

means for storing and displaying an electronic sheet, said electronic sheet being logically divided into a grid of cells, each cell being able to contain no more than a single character;

means to enable a user to select a portion of said electronic sheet, said portion comprising at least one cell;

means, responsive to a user input, for editing said selected portion of said electronic sheet; and means for distributing updates resulting from editing said electronic sheet to the other computer workstations in the data conferencing system, such that all the workstations in the data conferencing system share the same said electronic sheet.

2. The data conferencing system of claim 1, further comprising means responsive to a user's request to display said grid of cells on said electronic sheet.

3. The data conferencing system of claim 1, further comprising means for visually highlighting said selected portion of said electronic sheet.

4. The data conferencing system of claim 2, further comprising means for visually highlighting said selected portion of said electronic sheet.

5. The data conferencing system as in any of preceding claims 1–4 wherein said means for editing includes means for operations performed en bloc upon said selected portion of said electronic sheet.

6. The data conferencing system as in any of claims 1–4, wherein said editing means includes means for operations performed upon the characters contained within said selected portion of said electronic sheet.

7. The data conferencing system of claim 5, further comprising means for performing mathematical operations on said characters within said selected portion of said electronic sheet.

8. The data conferencing system of claim 6, further comprising means for performing mathematical operations on said characters within said selected portion of said electronic sheet.

9. The data conferencing system of any of claims 1–4, further comprising means responsive to a user selection of a portion of said electronic sheet for preventing users at other workstations from selecting said same portion of said electronic sheet.

10. The data conferencing system of claim 5, further comprising means responsive to a user selection of a portion of said electronic sheet for preventing users at other workstations from selecting said same portion of said electronic sheet.

11. The data conferencing system of claim 6, further comprising means responsive to a user selection of a portion of said electronic sheet for preventing users at other workstations from selecting said same portion of said electronic sheet.

12. The data conferencing system of claim 10, further comprising means for performing mathematical operations on said characters within said selected portion of said electronic sheet.

13. The data conferencing system of claim 11, further comprising means for performing mathematical operations on the characters within said selected portion of said electronic sheet.

14. The data conferencing system of any of claims 1–4, wherein the characters within said electronic sheet are stored in ASCII format.

15. A computer workstation including:

means for storing and displaying an electronic sheet, said electronic sheet being logically divided into a set of cells, each said cell being able to contain no more than a single character;

means to enable a user to select a portion of said electronic sheet, said portion comprising at least one said cell; and means, responsive to a user input, for editing said selected portion of said electronic sheet.

16. A method of operating a data conferencing system, including at least two computer workstations linked by a data network, said method comprising the steps at each workstation of:

storing and displaying an electronic sheet, the electronic sheet being logically divided into a set of cells, each cell being able to contain no more than a single character;

selecting, responsive to user input, a portion of the electronic sheet, a portion comprising at least one cell;

editing, responsive to a user input, the selected portion of the electronic sheet; and distributing updates resulting from editing the electronic sheet to the other computer workstations in the data conferencing system, such that all the workstations in the data conferencing system share the same electronic sheet.

* * * * *